Patented Mar. 9, 1943

2,313,392

UNITED STATES PATENT OFFICE 2,313,392

MALEIC ANHYDRIDE-TAR BASE CONDENSATION PRODUCT AND PROCESS FOR ITS PRODUCTION

Stuart P. Miller, Scarsdale, N. Y., assignor, by mesne assignments, to Allied Chemical & Dye Corporation, a corporation of New York No Drawing. Application April 29, 1938, Serial No. 205,001

7 Claims. (Cl. 260—78)

This invention relates to novel condensation products and to the process by which they are produced.

The object of this invention is to produce novel condensation products. Another object of this invention is to produce novel condensation products by a reaction heretofore unknown. Other objects of this invention will be obvious from the detailed description thereof.

I have discovered that when maleic anhydride and a pyridine compound are reacted, carbon dioxide is evolved from the reaction mixture and novel condensation products are thereby produced. The reaction has been found to be a general one for aromatic compounds having a pyridine nucleus in which at least one position alpha to the nitrogen atom is unsubstituted; acridine and its homologues are thus excluded. The term "pyridine compound" is intended to include aromatic compounds having a pyridine nucleus in which at least one position alpha to the nitrogen atom is unsubstituted; e. g. pyridine, alkyl pyridines such as the picolines and the lutidines with the exception of $\alpha$-$\alpha'$ lutidine, quinoline, isoquinoline, homologues of these compounds in which at least one position alpha to the nitrogen atom is unsubstituted, and mixtures thereof such as are obtained from coal tar distillates, but not to include $\alpha$-$\alpha'$-substituted pyridines, and acridine and its homologues.

The reaction may be carried out by reacting maleic anhydride with either a relatively pure pyridine compound or with a mixture of pyridine compounds derived, for example, from coal, such as those obtained from coal tar distillates by acid extraction and distillation. Coal tar bases having a specific gravity of from 0.870 to 1.200, the major portions of which distill within the range of from 115° C. to 400° C. may be used. For example, the following coal tar base fractions (obtained in the distillation of coal tar) are suitable for use in the practice of this invention:

| | (1) | (2) | (3) | (4) |
|---|---|---|---|---|
| Specific gravity at 15.5° C | 1.061 | 1.095 | 1.120 | 1.135 |
| Bulb distillation (of 100 cc. sample): | | | | |
| Start | 134° | 103° | 198° | 259° C. |
| 5% | 165 | 178 | 220 | 262.5 |
| 10 | 186 | 210 | 229 | 266 |
| 20 | 208 | 236 | 242 | 272.5 |
| 30 | 228 | 249 | 254 | 281.5 |
| 40 | 238 | 255 | 264 | 286 |
| 50 | 243 | 261 | 275 | 302 |
| 60 | 246.5 | 273 | 293 | 320 |
| 70 | 250 | 289 | 319 | 335 |
| 80 | 254.5 | 310 | 347 | 349.5 |
| 90 | 268 | 327 | 358 | 355 |
| 95 | 295 | 345 | | |
| Dry | 305 | 345 | 358 | 356 |
| Distillate to dry point | 97 cc. | 95 cc. | 90 cc. | 91 cc. |
| Barometer, mm | 764 | 764 | 767 | 764 |

Preferably, about one mol of the pyridine compound is mixed gradually in the presence of a solvent with from about one to about two mols of maleic anhydride, and the mixture then heated with continuous agitation. Carbon dioxide is thereby evolved and the condensation product separates as a solid. At the completion of the reaction the solid may be crushed, if necessary, filtered, washed with a suitable solvent to remove impurities, and dried.

The mother liquor recovered from this process may contain unreacted pyridine compounds. This mother liquor may be combined with the wash liquor used to purify the solid product, and reacted with additional maleic anhydride in order to recover the unreacted pyridine compounds and any dissolved reaction product present in the wash liquor. Preferably, the mother liquor is reused only once, as it has been found that otherwise impurities tend to accumulate unduly therein.

The process described above may be varied to some extent. The ratio of the weight of the pyridine compound to that of maleic anhydride may be varied considerably, depending upon the pyridine compound used; but there should be preferably from about one to about two mols of maleic anhydride per mol of pyridine compound. The pyridine compound may be mixed with the maleic anhydride directly; preferably, however, the maleic anhydride is dissolved in a suitable solvent such as xylol, benzol, toluol, or coal tar naphtha, and the solution then mixed with the pyridine compound. The amount of solvent used to dissolve the maleic anhydride may be between two and eight times the weight of the anhydride, but it is to be understood any other suitable proportion of solvent may be used if desired. The temperature of the reaction may vary widely from approximately 0° C. to as high as the refluxing temperature of the reaction mixture. The time of reaction is dependent to some extent upon the temperature of the reaction and to some extent upon the pyridine compound used and may vary between one and 24 hours.

The products obtained in the practice of this invention are solids which may be easily ground to powders. They are wholly or partially soluble in water, depending upon the pyridine compound used, the higher boiling pyridine compounds giving products less soluble in water than the lower boiling ones.

The following examples illustrate the process of this invention. Amounts are given in parts by weight.

*Example 1.*—98 parts of maleic anhydride were dissolved in 210 parts of xylol and the solution was warmed to about 80° C. 150 parts of a coal tar fraction containing pyridine compounds and boiling from 198° C. to 358° C. were gradually added to the solution of maleic anhydride over a period of about one and one-half hours with continuous agitation. The mixture was then agitated for a further period of about 8 hours, the temperature being maintained at about 80° C., during which time a solid cake separated from the reaction mixture. Carbon dioxide was evolved during the first few hours of the reaction. The cake was removed from the vessel, broken up, filtered, finely ground, and washed with about 170 parts of xylol, the filtrate and wash xylol being recovered. The washed product was then dried at a temperature of 40° to 50° C. for several hours.

*Example 2.*—The mother liquor and the wash xylol obtained in the filtration and washing of the product of Example 1 were mixed and heated to 80° C. 98 parts of maleic anhydride were then added to the solution with continuous agitation. When the maleic anhydride was completely dissolved, 75 parts of a coal tar fraction containing pyridine compounds and boiling from 198° to 358° C. were added, and the agitation continued for a further period of about 6 hours, while maintaining the temperature of the mixture at 80° C., during which time a solid reaction product separated out of the mixture as a hard cake. Carbon dioxide was evolved during the first few hours of the reaction. The cake was then washed and dried as described in Example 1. The filtrate and wash xylol were combined, the xylol recovered by distillation and the residue discarded.

*Example 3.*—125 parts of maleic anhydride were dissolved in 525 parts of benzol at 70° C. and 50 parts of refined pyridine were then added to the solution, maintained at 70° C., over a period of 4 hours. The reaction mixture was then held at 70° C. for an additional 16 hours. Carbon dioxide was evolved during the first few hours of the reaction. The resulting solution was cooled, and the solid reaction products were removed from the vessel, broken up, filtered, ground, washed with hot benzol, and dried.

*Example 4.*—168 parts of maleic anhydride were dissolved in 700 parts of benzol at 0° C. and 80 parts of a coal tar fraction containing beta and gamma picolines were slowly added. The boiling range of the picoline fraction was as follows:

| 100 parts sample: | Distillation temperature |
|---|---|
| Start | 143.5°C. |
| 5% | 144.0 |
| 10 | 144.2 |
| 20 | 144.3 |
| 30 | 144.4 |
| 40 | 144.4 |
| 50 | 144.4 |
| 60 | 144.4 |
| 70 | 144.4 |
| 80 | 144.4 |
| 90 | 144.5 |
| 95 | 144.5 |
| Dry | 144.6 |
| Specific gravity at 15.5° C | 0.948 |

The reaction mixture was allowed to stand overnight and was then refluxed for 16 hours. Carbon dioxide was evolved during the refluxing period. The reaction mixture was cooled, and the solid reaction products were removed from the vessel, broken up, filtered, ground, washed, and dried.

*Example 5.*—147 parts of maleic anhydride were dissolved in 530 parts of benzol and 80 parts of a coal tar fraction containing lutidines were added. The boiling range of the lutidine fraction was as follows:

| 100 parts sample: | Distillation temperature |
|---|---|
| Start | 147.6°C. |
| 5% | 149.6 |
| 10 | 150.8 |
| 20 | 151.5 |
| 30 | 151.9 |
| 40 | 152.0 |
| 50 | 152.4 |
| 60 | 152.6 |
| 70 | 153.0 |
| 80 | 153.6 |
| 90 | 154.8 |
| 95 | 155.3 |
| Dry | 156.5 |
| Specific gravity at 15.5° C | 0.943 |

The reaction mixture was allowed to stand overnight and was then refluxed for 16 hours. Carbon dioxide was evolved during the first few hours of the reaction. The resulting solution was cooled, and the solid reaction products were removed from the vessel, broken up, filtered, ground, washed, and dried.

*Example 6.*—152 parts of maleic anhydride were dissolved in 440 parts of benzol and 100 parts of quinoline were added to the solution at a temperature of 70° C. over a period of one hour. The mixture was then refluxed for 18 hours. Carbon dioxide was evolved during the first few hours of the reaction. The resulting solution was cooled, and the solid reaction products were removed from the vessel, broken up, filtered, ground, washed, and dried.

*Example 7.*—152 parts of maleic anhydride were dissolved in 440 parts of benzol and 100 parts of isoquinoline were added at a temperature of 70° C. over a period of one hour. The mixture was then refluxed for 18 hours. Carbon dioxide was evolved during the first few hours of the reaction. The resulting solution was cooled, and the solid reaction products were removed from the vessel, broken up, filtered, ground, washed, and dried.

The exact constitution of the products of the invention is not known. The product formed by the reaction of refined pyridine and maleic anhydride as described in Example 3 was found to have the following analysis:

| | Per cent |
|---|---|
| Carbon | 54.06 |
| Hydrogen | 4.06 |
| Nitrogen | 7.02 |
| Oxygen (by difference) | 34.86 |

This analysis gives the empirical formula of $(C_9H_8NO_4)_n$.

By the process of this invention novel condensation products may be produced which are useful as inhibitors in the pickling of metals and are of interest in the manufacture of dyestuffs, pharmaceuticals, and synthetic organic chemicals and technical products.

Since certain changes in carrying out the above process and certain modifications in the products which embody the invention may be made without departing from its scope, it is intended all matter contained in the above description shall be considered illustrative and not in a limiting sense.

In the following claims the term "tar base" is intended to include not only substantially pure tar bases, but also substances containing substantial amounts of one or more tar bases.

I claim:
1. A solid condensation product obtained by bringing about reaction between components of a reaction mixture in which the reactants consist of maleic anhydride and tar base, in which tar base at least one position alpha to the nitrogen atom in a pyridine nucleus is unsubstituted, in the proportion of from 1 to 2 mols maleic anhydride per mol of tar base.

2. A solid condensation product obtained by bringing about reaction between components of a reaction mixture in which the reactants consist of maleic anhydride and pyridine, in the proportion of from 1 to 2 mols maleic anhydride per mol pyridine.

3. A solid condensation product obtained by bringing about reaction between components of a reaction mixture in which the reactants consist of maleic anhydride and alkyl pyridine, in which alkyl pyridine at least one position alpha to the nitrogen atom in a pyridine nucleus is unsubstituted, in the proportion of from 1 to 2 mols maleic anhydride per mol of alkyl pyridine.

4. A solid condensation product obtained by bringing about reaction between components of a reaction mixture in which the reactants consist of maleic anhydride and quinoline compound, in which quinoline compound at least one position alpha to the nitrogen atom in a pyridine nucleus is unsubstituted, in the proportion of from 1 to 2 mols maleic anhydride per mol of quinoline compound.

5. A process which comprises reacting components of a reaction mixture in which the reactants consist of maleic anhydride and pyridine compound, in which pyridine compound at least one position alpha to the nitrogen atom in a pyridine nucelus is unsubstituted, in the proportion of from 1 to 2 mols maleic anhydride per mol of pyridine compound to produce a solid condensation product.

6. A process which comprises reacting components of a reaction mixture in which the reactants consist of maleic anhydride and pyridine, in the proportion of from 1 to 2 mols maleic anhydride per mol pyridine, to produce a solid condensation product.

7. A process which comprises reacting components of a reaction mixture in which the reactants consist of maleic anhydride and a tar base, in the proportion of more than one mol maleic anhydride per mol of tar base, to produce a solid condensation product, said tar base having a specific gravity of from about .870 to about 1.200, the major portion of said tar base distilling within the range of from about 115° C. to about 400° C., and said tar base having at least one position alpha to the nitrogen atom in a pyridine nucleus unsubstituted.

STUART P. MILLER.